United States Patent
Bowcutt et al.

(10) Patent No.: US 10,190,539 B2
(45) Date of Patent: Jan. 29, 2019

(54) INLET FLOW RESTRICTOR

(71) Applicant: THE BOEING COMPANY, Chicago, IL (US)

(72) Inventors: Kevin Gerald Bowcutt, Aliso Viejo, CA (US); Thomas Russell Smith, Westminster, CA (US)

(73) Assignee: THE BOEING COMPANY, Chicago, IL (US)

( * ) Notice: Subject to any disclaimer, the term of this patent is extended or adjusted under 35 U.S.C. 154(b) by 617 days.

(21) Appl. No.: 14/789,185

(22) Filed: Jul. 1, 2015

(65) Prior Publication Data
US 2017/0002768 A1    Jan. 5, 2017

(51) Int. Cl.
| | |
|---|---|
| F02C 7/042 | (2006.01) |
| F02K 7/10 | (2006.01) |
| F02C 7/057 | (2006.01) |
| F02C 7/045 | (2006.01) |
| F02C 7/04 | (2006.01) |
| B64D 33/02 | (2006.01) |

(52) U.S. Cl.
CPC .............. *F02K 7/10* (2013.01); *B64D 33/02* (2013.01); *F02C 7/04* (2013.01); *F02C 7/042* (2013.01); *F02C 7/045* (2013.01); *F02C 7/057* (2013.01); *B64D 2033/026* (2013.01); *B64D 2033/0206* (2013.01); *B64D 2033/0253* (2013.01); *F05D 2220/10* (2013.01); *F05D 2260/96* (2013.01); *F05D 2270/17* (2013.01)

(58) Field of Classification Search
CPC .. F02C 7/04; F02C 7/042; F02C 7/045; F02C 7/057; B64D 33/02; B64D 2033/0206; B64D 2033/0253; B64D 2033/026
See application file for complete search history.

(56) References Cited

U.S. PATENT DOCUMENTS 4,186,554 A * 2/1980 Possell ...................... F01D 1/36
                                                      415/90
4,307,743 A * 12/1981 Dunn ...................... B64D 33/02
                                                    137/15.1

(Continued)

OTHER PUBLICATIONS

Extended European Search Report for EP16166237.4 dated Nov. 30, 2016.

(Continued)

*Primary Examiner* — Gerald L Sung
*Assistant Examiner* — Marc Amar
(74) *Attorney, Agent, or Firm* — Marshall, Gerstein & Borun LLP (57) ABSTRACT

A hypersonic vehicle has a body, a control surface, and a hypersonic air-breathing engine. The engine includes a converging inlet having a fixed cowling having a first cross-sectional area and a throat having a second cross-sectional area. A flow restrictor is movable between a stowed position and a fully deployed position. The flow restrictor has a third cross-sectional area that is smaller than the first cross-sectional area, such that a consistent gap is formed between a periphery of the flow restrictor and an inner surface of the cowling with the flow restrictor in the fully deployed position and the difference between the first cross-sectional area and the third cross-sectional area is approximately equal to the second cross-sectional area.

21 Claims, 8 Drawing Sheets

(56) References Cited

U.S. PATENT DOCUMENTS

| | | | | |
|---|---|---|---|---|
| 4,620,679 | A | * | 11/1986 | Karanian ............... B64D 33/02 137/15.1 |
| 4,745,740 | A | * | 5/1988 | Dunn ...................... F02C 7/042 60/234 |
| 5,085,048 | A | | 2/1992 | Kutschenreuter, Jr. et al. |
| 5,806,301 | A | | 9/1998 | auBuchon et al. |
| 5,884,871 | A | * | 3/1999 | Fedorov ................. B64C 23/00 244/130 |
| 6,276,632 | B1 | * | 8/2001 | Sanders ................ B64D 33/02 244/53 B |
| 7,642,682 | B1 | * | 1/2010 | Matheny ................ F01D 15/10 310/90 |
| 8,292,217 | B2 | | 10/2012 | Smith et al. |
| 8,371,324 | B1 | * | 2/2013 | Fink ........................ F02C 7/042 137/15.1 |
| 8,662,453 | B2 | * | 3/2014 | Richards ................ F01D 5/145 244/207 |
| 2009/0158705 | A1 | * | 6/2009 | Grossi ...................... F02K 1/36 60/269 |
| 2010/0181436 | A1 | * | 7/2010 | Richards ................ F01D 5/145 244/53 B |
| 2011/0000548 | A1 | * | 1/2011 | Sanders ................ B64D 33/02 137/1 |
| 2012/0036827 | A1 | * | 2/2012 | Delapierre ............. F02C 6/206 60/39.093 |
| 2012/0260661 | A1 | * | 10/2012 | Megerian ................ F02C 7/057 60/772 |
| 2014/0208767 | A1 | * | 7/2014 | Suzuki ...................... F02K 9/68 60/780 |
| 2017/0167504 | A1 | * | 6/2017 | Jablonski .............. F04D 29/329 |
| 2018/0016000 | A1 | * | 1/2018 | Pastouchenko ......... B64C 21/06 |

OTHER PUBLICATIONS

NASA Contractor Report 182147, "Hypersonic Turbulent Wall Boundary Layer Computations", May 1988.

I. Jang et al., Center for Turbulence Research Annual Research Briefs, "A Numerical Study of the Unstart Event in an Inlet/Isolator Model", 2010.

H. Do et al., 17th AIAA International Space Planes and Hypersonic Systems and Technologies Conference, "The Influence of Boundary Layers on Supersonic Inlet Unstart", Apr. 2011.

NASA/TM—2012-217612, "Analysis of Buzz in a Supersonic Inlet", May 2012.

Mitchel H. Bertram, National Advisory Committee for Aeronautics, "An Approximate Method for Determining the Displacement Effects and Viscous Drag of Laminar Boundary Layers in Two-Dimensional Hypersonic Flow", Sep. 1952.

Thesis by Ronald L. Richmond, "Experimental Investigation of Thick, Axially Symmetric Boundary Layers on Cylinders at Subsonic and Hypersonic Speeds", 1957.

Martin Sichel, "The Effect of the Boundary Layer Upon the Flow in a Conical Hypersonic Wind Tunnel Nozzle", Jul. 1963.

N.B. Wood, "Calculation of the Turbulent Boundary Layer in the Nozzle of an Intermittent Axisymmetric Hypersonic Wind Tunnel", 1964.

J.C. Dutton et al., "Numerical and Experimental Investigation of Multiple Shock Wave/Turbulent Boundary Layer Interactions in a Rectangular Duct", Jan. 1988.

* cited by examiner

INLET FLOW RESTRICTOR

FIELD

This invention relates to hypersonic vehicles and, more specifically, to air-breathing engines and inlet flow restrictors for hypersonic vehicles.

BACKGROUND

Hypersonic vehicles are vehicles, such as aircraft, missiles, space planes, airplanes, drones, etc., capable of traveling at hypersonic speeds. As used herein, hypersonic is considered speeds above Mach 5, supersonic is considered speeds above Mach 1, and subsonic is considered speeds below Mach 1.

Hypersonic vehicles may use some type of air-breathing hypersonic engine, such as a scramjet engine, as the means of propulsion. A scramjet engine is an air-breathing jet engine in which combustion takes place in supersonic airflow. Scramjet engines rely on high vehicle speed to forcefully contract the incoming air before combustion and keep the air at supersonic speeds throughout the engine. Keeping the air at supersonic speeds through the engine allows a scramjet to operate efficiently at extremely high speeds.

A typical scramjet engine is composed of three basic components: a converging inlet, where incoming air is contracted; a combustor, where fuel is burned with atmospheric oxygen to produce heat and increase resulting combustion product pressure; and a diverging nozzle, where the hot exhaust gas is accelerated to produce thrust. Unlike a typical jet engine, such as a turbojet or turbofan engine, a scramjet engine does not use rotating, fan-like components to contract the air. Instead, the speed of the vehicle causes the air to contract within the inlet. Thus, one benefit over conventional combustion engines is there are no compressor blades or moving parts. However, since a scramjet engine lacks a mechanical compressor, these hypersonic engines require the high kinetic energy of a hypersonic flow to contract the incoming air to operational conditions. Thus, a hypersonic vehicle powered by a scramjet engine must be accelerated to the required velocity (usually about Mach 4) by some other means of propulsion, such as a turbojet, rocket engine, light gas gun, rail gun, etc., to a speed where the scramjet engine can be ignited.

For a period of time during acceleration, the speed of the hypersonic vehicle will be too low for the hypersonic engine inlet to ingest all oncoming airflow. If the flow approaching the inlet at a given supersonic speed, pressure, temperature, and angle of attack, cannot all pass through the inlet, a strong shockwave system will form in front of the inlet, reducing the flow speed and spilling a fraction of the oncoming air flow around the inlet. This creates a large inlet drag. The strong shockwave also separates the airflow boundary layer at the wall, creating a violently unsteady and noisy inlet flow behavior called "inlet buzz." An analysis of predictions regarding "inlet buzz" using computational fluid dynamics and actual test results of "inlet buzz" in a dual-stream, low-boom supersonic inlet can be found in National Aeronautics and Space Administration, NASA/TM—2012-217612, *Analysis of Buzz in a Supersonic Inlet* (2012). This state of inlet operation is commonly referred to as "unstart." A detailed description and analysis of the "unstart" process can be found in Center for Turbulence Research, Annual Research Briefs 2010, pgs. 93-103, *A Numerical Study of the Unstart Event in an Inlet/Isolator Model* (2010). In addition, a detailed study of the influence of boundary layers on the "unstart" process can be found in 17th AIAA International Space Planes and Hypersonic Systems and Technologies Conference, AIAA 2011-2349, *The Influence of Boundary Layers on Supersonic Inlet Unstart* (2011). The very high acoustic and vibratory loads produced by inlet buzz can be detrimental to the vehicle structure, onboard systems, and/or vehicle stability and control, requiring possible onerous design solutions to mitigate the negative effects. The same problem can be encountered when the hypersonic vehicle decelerates, such as upon descent to target impact for a missile.

Figure 12:
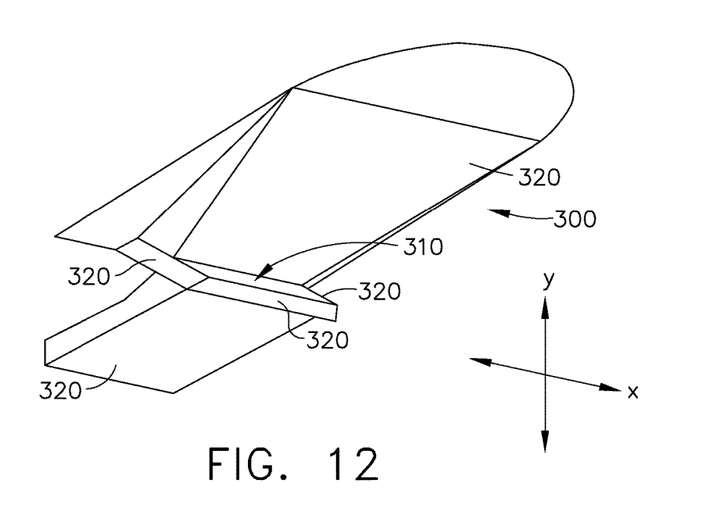
FIG. 12 is a bottom perspective view of a 2D inlet for a hypersonic vehicle.

There are various means commonly employed to avoid the negative effects of inlet buzz and unstart, depending on if the inlet of the hypersonic engine is a 2D inlet or a 3D inlet. A 2D inlet engine, such as that shown in FIG. 12 and generally designated as 300, has a rectangular inlet 310, where all walls 320 are linear in x-y planes. These 2D inlet engines 300 can employ variable geometry inlets to prevent inlet unstart by reducing inlet area ratio, commonly called contraction ratio, when the vehicle is traveling at lower speeds. In contrast, a 3D inlet engine has a curved inlet, where the walls are curvilinear and can have complicated curvatures. These inlets can provide advantages in inlet compression efficiency and are compatible with combusters having circular or elliptical cross-sections, which are more structurally efficient than combustors with rectangular cross-sections.

For a 2D inlet engine, one current means to avoid inlet buzz and unstart is to mechanically close the inlet with a rotating cowl flap until ready to start the engine, at which time the inlet flap is rotated open. The rotating cowl flap can close the inlet entirely, or open it partially, preventing unstart. Another possible means to avoid inlet buzz and unstart is the use of bypass doors in the inlet that divert a portion of the oncoming airflow into separate channels that exhaust the airflow into a low-pressure region of the vehicle. This effectively increases the throat area of the inlet and reduces inlet internal contraction ratio. While high inlet internal contraction ratio is the root cause of inlet unstarts, a high inlet contraction ratio is required to achieve high engine performance at high vehicle speeds. Therefore, while using a cowl flap or internal bypass doors on a low internal contraction ratio 2D inlet can solve the problem, this design solution is mechanically complex and increases inlet weight. However, a rotating cowl flap cannot readily be incorporated on a 3D inlet because of surface curvature and the mechanical problems of bypass doors would be daunting for 3D inlet engines.

For a 3D inlet engine, which may increase overall vehicle performance, an alternative means is required to prevent the negative effects of inlet unstart and buzz during both aircraft acceleration and deceleration. One current means for 3D inlet engines is to cover the inlet with a fairing or shroud that is ejected from the vehicle just prior to starting the hypersonic engine. However, once the fairing or shroud is ejected, there is nothing to protect the hypersonic engine when the vehicle decelerates.

Therefore, there is a need for an effective means for avoiding inlet buzz and unstart in 2D and 3D engine inlets and, in particular, in 3D engine inlets that maintains the high contraction ratio of the 3D engine inlet and that can be used during acceleration and deceleration of the hypersonic vehicle.

SUMMARY

In one embodiment of the present invention, a hypersonic vehicle comprises a body, at least one control surface associated with the body, and a hypersonic air-breathing engine associated with the body. The engine comprises a converging inlet and a flow restrictor. The converging inlet has a fixed cowling having a first cross-sectional area and a throat in fluid communication with the cowling and having a second cross-sectional area, smaller than the first cross-sectional area. The flow restrictor is movable between a stowed position and a fully deployed position. The flow restrictor has a third cross-sectional area that is smaller than the first cross-sectional area of the cowling, such that a consistent gap is formed between a periphery of the flow restrictor and an inner surface of the cowling with the flow restrictor in the fully deployed position and the difference between the first cross-sectional area of the cowling and the third cross-sectional area of the flow restrictor is approximately equal to the second cross-sectional area of the throat.

In another embodiment of the present invention, an air-breathing engine for a hypersonic vehicle comprises a converging inlet and a flow restrictor. The converging inlet has a fixed cowling and a throat in fluid communication with the cowling. The flow restrictor is movable between a stowed position and a fully deployed position. A consistent gap is formed between a periphery of the flow restrictor and an inner surface of the cowling such that the inlet has an internal contraction ratio of approximately 1:1 with the flow restrictor in the fully deployed position.

In yet another embodiment of the present invention, a method of preventing inlet buzz and unstart conditions in a hypersonic air-breathing engine, comprising the steps of: providing a converging inlet having a fixed cowling having a first cross-sectional area and a throat in fluid communication with the cowling and having a second cross-sectional area, smaller than the first cross-sectional area; and moving a flow restrictor from a stowed position to a fully deployed position, in which the flow restrictor deflects a portion if the air flow outside of the inlet; wherein the flow restrictor has a third cross-sectional area that is smaller than the first cross-sectional area of the cowling, such that a consistent gap is formed between a periphery of the flow restrictor and an inner surface of the cowling and the difference between the first cross-sectional area of the cowling and the third cross-sectional area of the flow restrictor is approximately equal to the second cross-sectional area of the throat.

The features, functions, and advantages that have been discussed can be achieved independently in various embodiments or may be combined in yet other embodiments further details of which can be seen with reference to the following description and drawings.

DESCRIPTION

One example described herein provides an adjustable inlet for use in a hypersonic air-breathing engine of a hypersonic vehicle that enables adjustable flow control during subsonic and supersonic speeds, for example, during acceleration prior to hypersonic engine start or during deceleration of the vehicle. This can prevent or mitigate inlet buzz and unstart and enables the use of an optimized, high inlet internal contraction ratio, highly curved 3D inlets.

In this example, a deployable flow restrictor can be positioned in front of a fixed cowling, for example a curvilinear fixed cowling, of a converging inlet that will limit the amount of air flow ingested by the inlet to prevent inlet buzz and unstart conditions with air flow speeds below an operating limit of the engine. When deployed, the flow restrictor can smoothly deflect a large fraction of the inlet air flow around the inlet and allow a small fraction of the inlet air flow to be ingested by the inlet to pass through the inlet throat at supersonic speed. When fully deployed at operational velocities, the flow restrictor can skim or peel off a fraction of the supersonic boundary layer momentum thickness to prevent boundary layer separation and thus unstart. The fraction can be determined as a function of the design of the inlet and the intended operational hypersonic environment, which will in turn establish the optimal gap or gap intervals that enable the inlet to mitigate effects leading to unstart. Reducing the amount of inlet air flow that is ingested by the inlet at subsonic and supersonic speeds allows the inlet air to avoid contraction or to be minimally contracted in the inlet without becoming sonic (Mach 1 speed) at the inlet throat, which is called "choking," thereby allowing it all to pass through the inlet at supersonic or hypersonic speeds, preventing inlet unstart and buzz. The flow restrictor allows the inlet structure to be continuous and uninterrupted, thus preserving strength and the ability to contain the high inlet pressure. In addition, the flow restrictor can be actuated from its center, eliminating cantilever loads a flap would otherwise have to counteract.

Referring to FIGS. 1-4, one example of a hypersonic vehicle 10 has a body 20 and at least one control surface 30 associated with body 20. Control surface 30 could be a wing elevon, tail, elevator, flap, or any other type of control surface capable of controlling hypersonic vehicle 10 during flight and can be connected to or integral with body 20. A hypersonic air-breathing engine 40 is also associated with body 20 and can be connected to or integral with and disposed within body 20.

Figure 1:
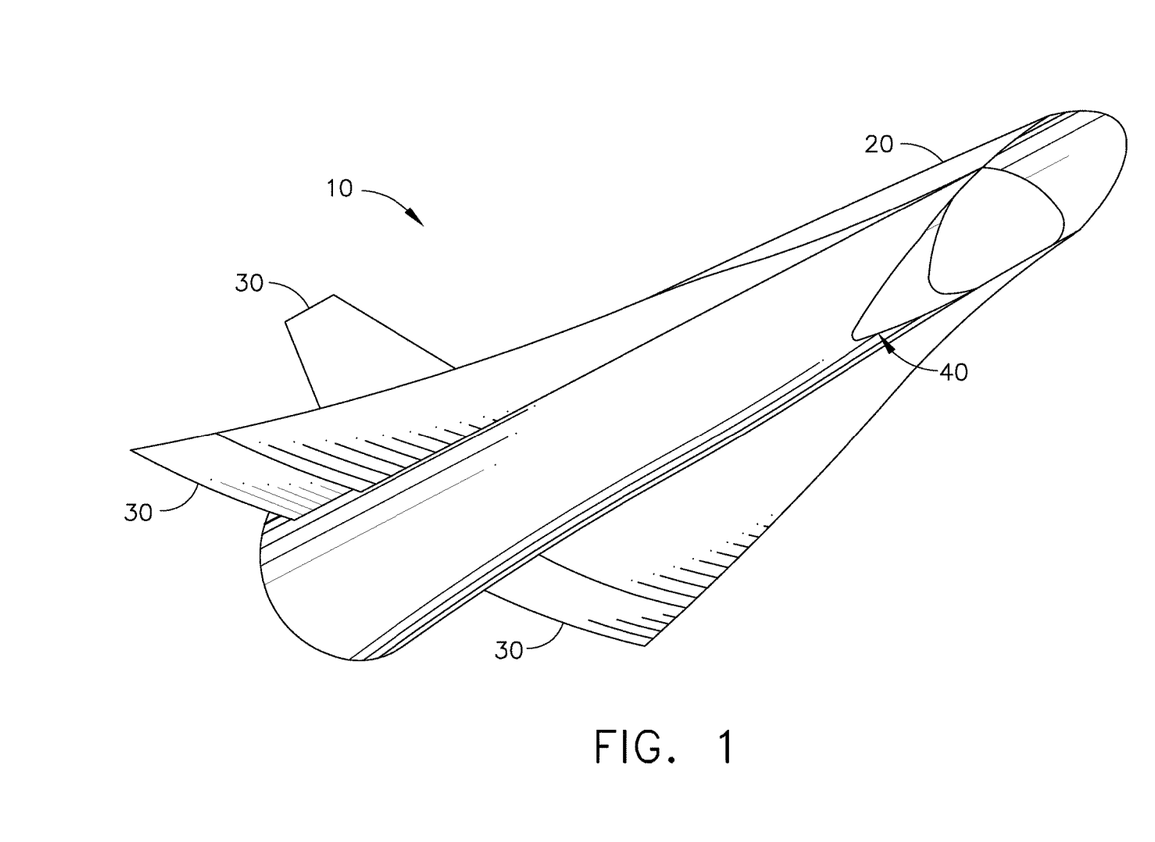
FIG. 1 is a bottom perspective view of an example hypersonic vehicle with an inlet flow restrictor.
Figure 2:
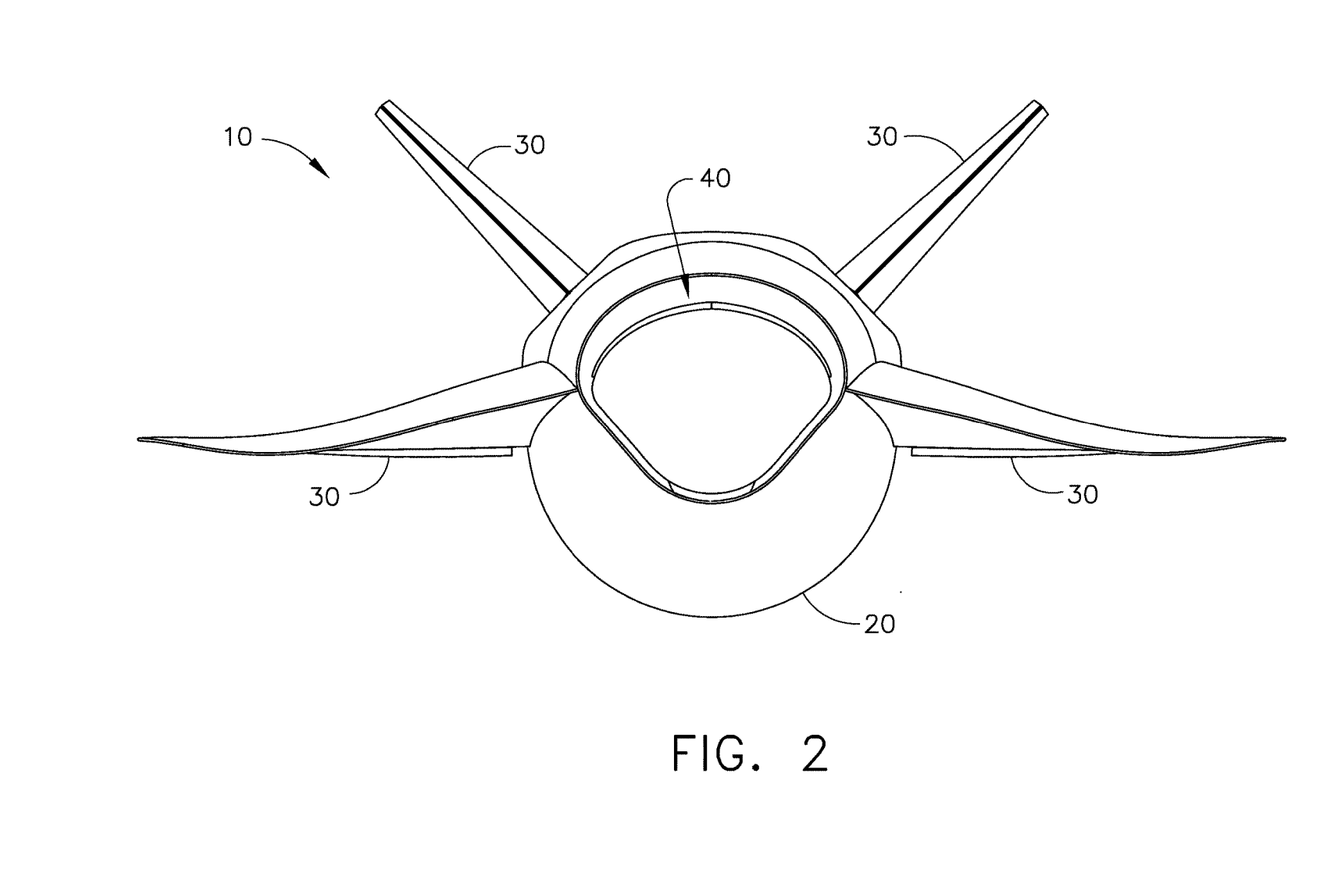
FIG. 2 is a front plan view of the hypersonic vehicle of FIG. 1 with the inlet flow restrictor in a fully deployed position.
Figure 3:
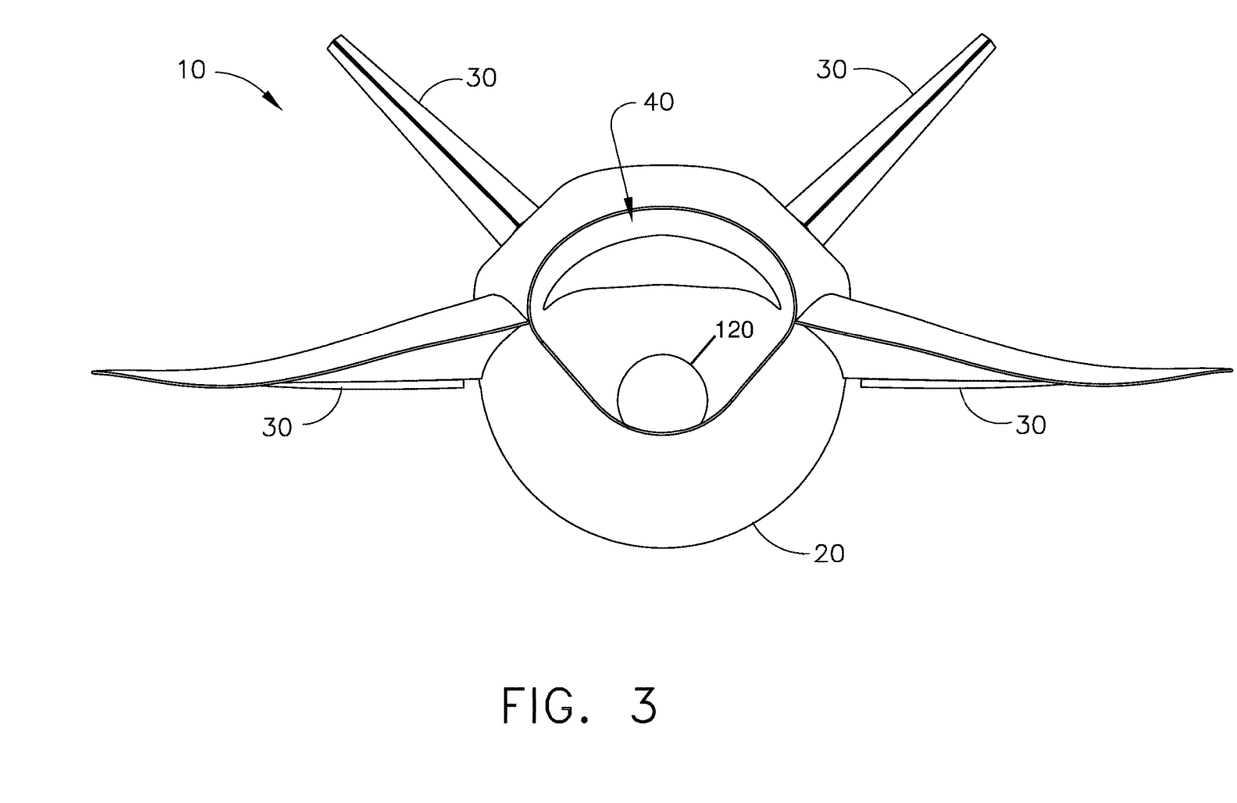
FIG. 3 is a front plan view of the hypersonic vehicle of FIG. 1 with the inlet flow restrictor in a fully retracted position.
Figure 4:
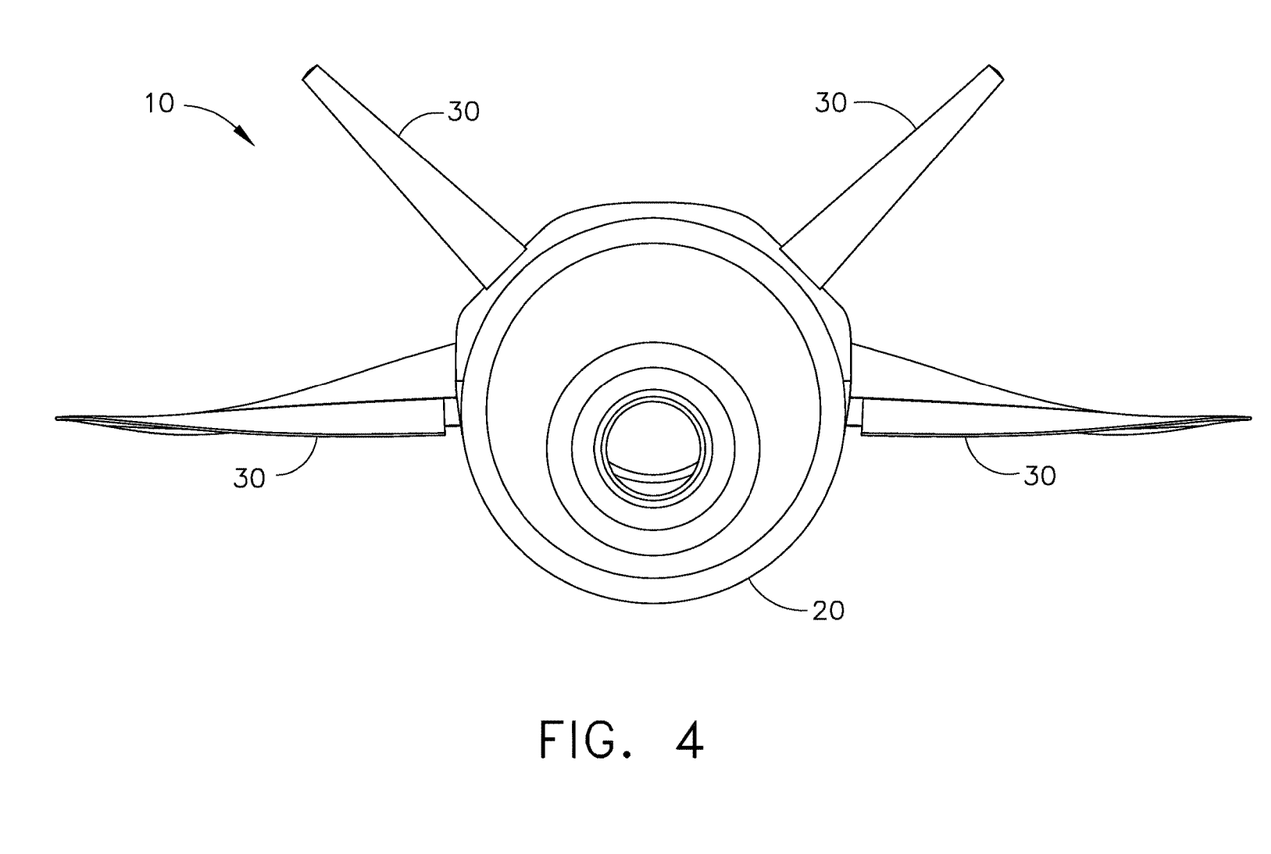
FIG. 4 is a rear plan view of the hypersonic vehicle of FIG. 1 with the inlet flow restrictor in the fully deployed position.
Figure 5:
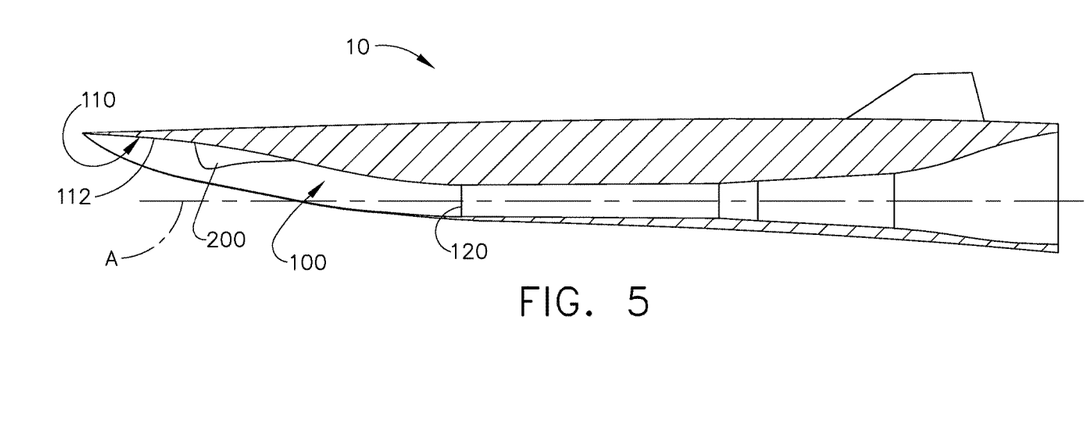
FIG. 5 is a side cross-sectional view of the hypersonic vehicle of FIG. 1 with the inlet flow restrictor in the fully retracted position.

Referring to FIGS. 5-11, one example of a converging inlet 100 and flow restrictor 200 that can be used as part of the hypersonic air-breathing engine 40 of hypersonic vehicle 10 are shown. In the example shown, converging inlet 100 is a 3D inlet having a curvilinear fixed cowling 110 and a throat 120. Although the example converging inlet 100 is a 3D inlet, it will be understood that the present invention can also be used with 2D inlets as well. Cowling 110 has one or more walls 112 that have a curvilinear shape and can have very complicated curvatures. The curvilinear shapes of walls 112 optimize cowling 110 for hypersonic flow ingestion and define a first cross-sectional area associated with C (FIG. 7), taken perpendicular to a longitudinal axis A of inlet 100, within an inner surface 114 of cowling 110, as can be seen in FIG. 5. For example, a hypersonic vehicle having a length of 10-15 feet could have a cowling with a cross-sectional area of 0.6-1.3 ft$^2$, a hypersonic vehicle having a length of 30-50 feet could have a cowling with a cross sectional area of 5.1-14.0 ft$^2$, and a hypersonic vehicle having a length of 100-150 feet could have a cowling with a cross-section area of 56.0-126.0 ft$^2$. Throat 120 is in fluid communication with cowling 110 and contracts air flow entering through cowling 110 prior to the air flow entering a combustion portion of engine 40. In order to contract the air flow entering inlet 100 through cowling 110, throat 120 defines a second cross-sectional area associated with D (FIG. 7), taken perpendicular to longitudinal axis A, that is smaller than the first cross-sectional area of the cowling 110. For example, a hypersonic vehicle having a length of 10-15 feet could have a throat with a cross-sectional area of 0.1-0.2 ft$^2$, a hypersonic vehicle having a length of 30-50 feet could have a throat with a cross sectional area of 0.7.-2.1 ft$^2$, and a hypersonic vehicle having a length of 100-150 feet could have a throat with a cross-section area of 8.2-18.5 ft$^2$.

Figure 8:
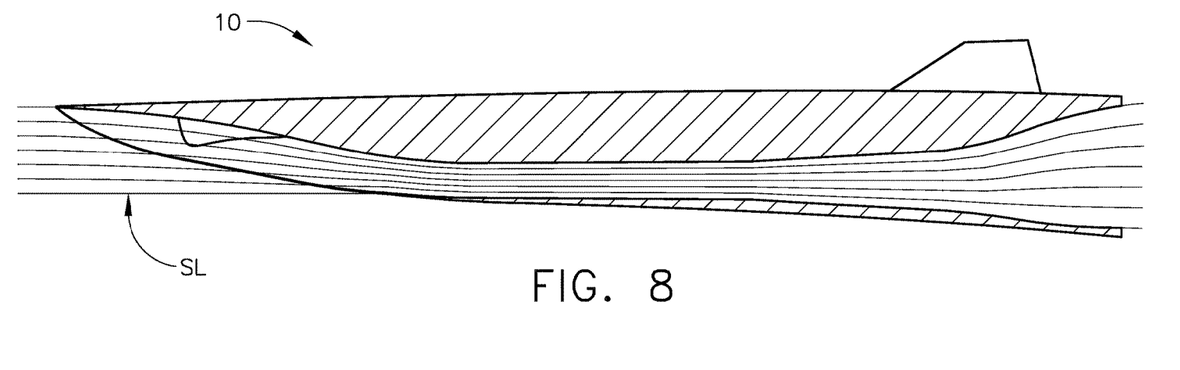
FIG. 8 is the side cross-sectional view of FIG. 5 with flow lines illustrating air flow through the hypersonic vehicle.

As can be seen by the flow lines in FIG. 8, in operation, air flow enters inlet 100 through cowling 110 and the curvilinear walls 112 direct the air flow to throat 120. Walls 112 contract the air flow, without slowing the airflow below supersonic speeds, and direct the air flow to a combustor or combustion chamber where fuel is mixed with the compressed air flow to produce heat and further increase air pressure. The heated high-pressure air is then accelerated by a diverging nozzle of engine 40 to produce thrust.

As discussed above, when hypersonic vehicle 10 is traveling at supersonic speeds below a certain threshold, hypersonic engine 100 cannot ingest all oncoming air flow, which can result in a strong shockwave system forming in front of inlet 100, separating airflow off the vehicle wall, creating inlet buzz and unstart conditions. In order to prevent or minimize possible inlet buzz and unstart conditions, the example engine 40 can include a flow restrictor 200 that is movable between a stowed or retracted position (FIGS. 3, 5, and 8), a partially deployed position (FIG. 6), and a fully deployed position (FIGS. 1-2, 4, 7, and 9-11).

Figure 10:
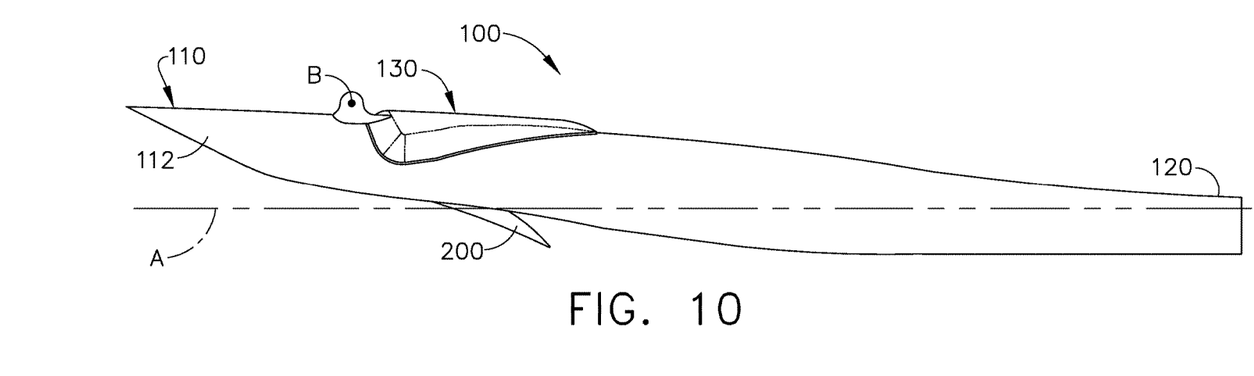
FIG. 10 is a side plan view of an example 3D inlet for a hypersonic vehicle with the inlet flow restrictor in a fully deployed position.

Referring specifically to FIGS. 5 and 10, in the stowed or retracted position, flow restrictor 200 can be stowed within a conformal restrictor recess 130 formed in one of the walls 112 of the inlet 100. Conformal restrictor recess 130 has the same shape as flow restrictor 200 and flow restrictor 200 nests within recess 130 so that flow restrictor 200 does not impede air flow into the inlet. as shown by flow lines SL in FIG. 8, in the stowed position. By creating recess 130 in wall 112 of inlet 100, the structure of inlet 100 remains continuous and a good pressure barrier.

Figure 6:
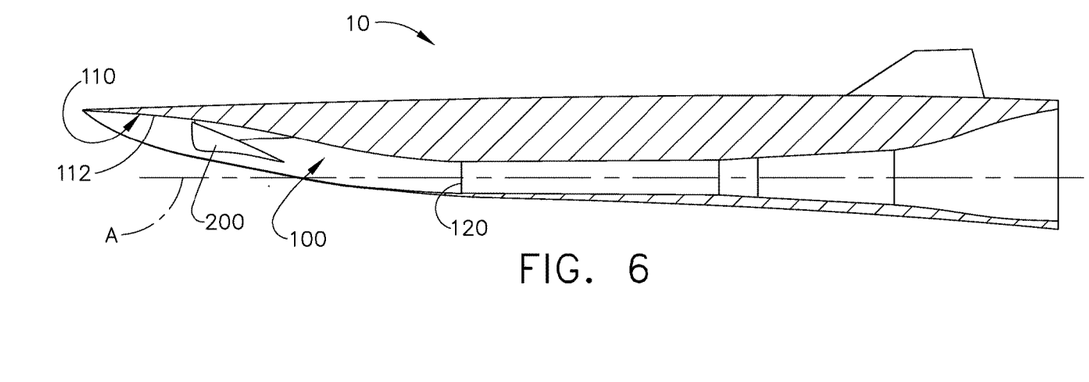
FIG. 6 is a side cross-sectional view of the hypersonic vehicle of FIG. 1 with the inlet flow restrictor in a partially deployed position.
Figure 7:
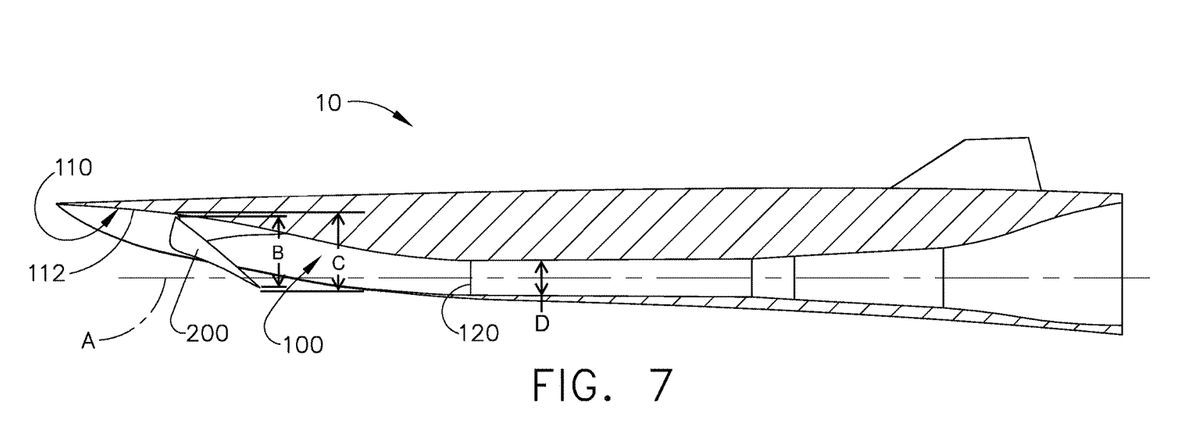
FIG. 7 is a side cross-sectional view of the hypersonic vehicle of FIG. 1 with the inlet flow restrictor in the fully deployed position.

Referring to FIG. 6, flow restrictor can also be positioned in a partial deployed position, if desired, which can be used to reduce the amount of air flow that is directed into the inlet 100.

Figure 9:
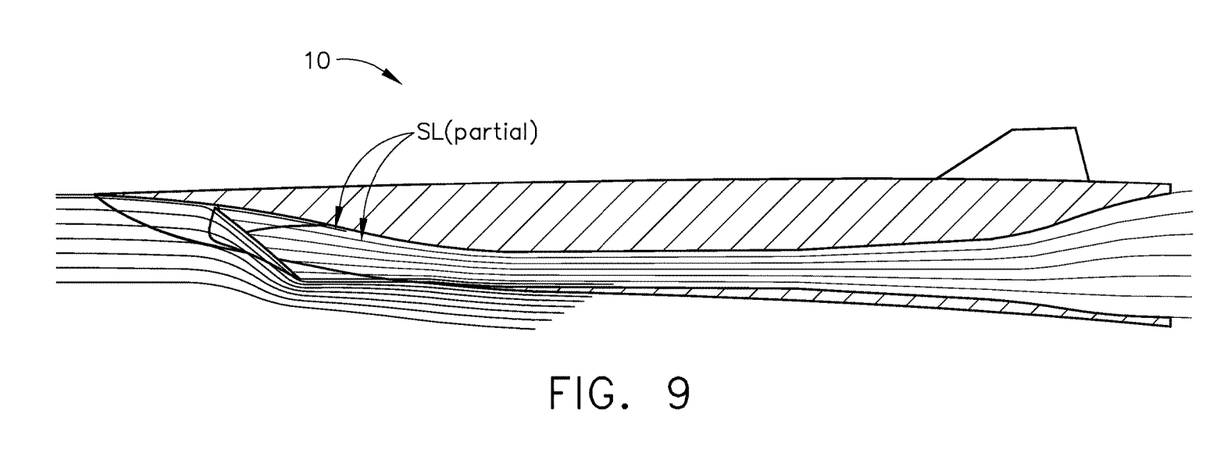
FIG. 9 is the side cross-section view of FIG. 7 with flow lines illustrating air flow through the hypersonic vehicle and around the inlet flow restrictor.

Referring to FIGS. 7 and 9-11, in the fully deployed position, which in the example shown is approximately 30 degrees from the longitudinal axis A, a first portion of the air flow approaching the inlet 100 will strike flow restrictor 200, which will smoothly deflect the first portion of the air flow outside of the inlet, as shown by the flow lines in FIG. 9. This smooth deflection of the air flow outside of inlet 100 by flow restrictor 200 prevents the buildup of a strong shock wave in front of inlet 100, which prevents inlet buzz and unstart conditions with the flow restrictor in the fully deployed position and the air flow at speeds below where the inlet can start.

Figure 11:
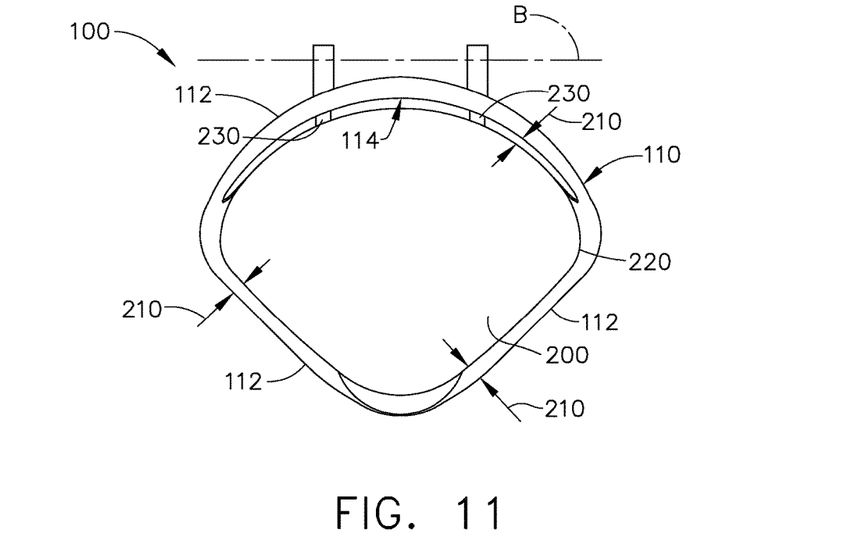
FIG. 11 is a front plan view of the 3D inlet of FIG. 10.

In addition, as can best be seen in FIG. 11, in the fully deployed position the flow restrictor 200 has a third cross-sectional area associated with B (FIG. 7), taken perpendicular to the longitudinal axis A, that is smaller than the first cross-sectional area of the cowling 110, such that a consistent gap 210 is formed around flow restrictor 200 between a periphery 220 of flow restrictor 200 and inner surface 114 of cowling 110, which allows a second portion of the air flow, not deflected by flow restrictor 200, to flow into the inlet 100, as shown by flow lines SL (partial) in FIG. 9. For example, a hypersonic vehicle having a length of 10-15 feet could have a gap of about 0.3-0.5 in, a hypersonic vehicle having a length of 30-50 feet could have a gap of about 1.0-1.6 in, and a hypersonic vehicle having a length of 100-150 feet could have a gap of about 3.2-4.8 in. In the example shown, the difference between the first cross-sectional area of cowling 110 and the third cross-sectional area of flow restrictor 200 is approximately equal to the second cross-sectional area of throat 120. This provides an internal contraction ratio of approximately 1:1 with flow restrictor 200 in the fully deployed position, which means the air flow allowed to flow into inlet 100 will not be contracted, or will be minimally contracted, and will not be slowed below supersonic speeds in the case of supersonic flight nor accelerated to sonic speed in the case of subsonic flight, due to contraction of the inlet air flow. The gap 210 between flow restrictor 200 and inner surface 114 of cowling 110 allows the boundary layer to pass below flow restrictor 200 preventing flow separation due to boundary layer resistance created by flow restrictor 200, which can be adjusted, as desired, such that the resulting internal contraction ratio is low enough to also prevent buzz and unstart conditions.

One method for designing the shape of flow restrictor 200 is to rotate a portion of inner surface 114 of cowling 110 by the angle that will place flow restrictor 200 in the fully deployed position, for example 30 degrees. The boundary of the first cross-sectional area of cowling, taken perpendicular to longitudinal axis A, is then projected into a frontal plane and offset inward by gap 210 to create the profile of flow restrictor 200.

As will be realized by those skilled in the art, the following formulas can be used to determine the boundary layer and, therefore, the optimal size of the flow restrictor and gap. These formulae enable rough sizing of flow restrictor 200 and gap 210 by enabling a general analysis of the boundary layers for laminar and turbulent flow, these 'flat plate' relationships must be adapted to the desired structural configuration of the contemplated flow restrictor, which is not intended to be a flat plate. Those knowledgeable in the relevant aerodynamic technology will recognize that a combination of computational fluid dynamic analysis can be applied to generate more application focused boundary layer analyses, and a resultant flow restrictor 200 and gap 210 configuration.

LAMINAR FLOW $$\delta_i = 4.64x / \sqrt{Re_x}$$

$$\delta_c = \left(\frac{\delta_c}{\delta_i}\right)\delta_i$$

$$\delta_c^*\left(\frac{\delta_c}{\delta_i}\right)\delta_i^* = 0.375\delta_i\left(\frac{\delta_c}{\delta_i}\right)$$

$$\theta_c\left(\frac{\theta_c}{\theta_i}\right)\theta_i = 0.139\delta_i\left(\frac{\theta_c}{\theta_i}\right)$$

where $$\frac{\delta_c}{\delta_i} = \left(\frac{\mu^* T^*}{\mu_e T_e}\right)^{1/2}$$

$$\frac{\theta_c}{\theta_i} = \left(\frac{\mu^*}{\mu_e}\right)^{1/2} / \left(\frac{T^*}{T_e}\right)^{1/2}$$

$$\frac{T^*}{T_e} = 0.5 + 0.037 M_e^2 + 0.5\left(\frac{T_w}{T_e}\right)$$

$$\frac{\mu^*}{\mu_e} = \left(\frac{T^*}{T_e}\right)^{3/2} \left[\frac{1 + \frac{110}{T_e}}{\frac{T^*}{T_e} + \frac{110}{T_e}}\right]$$

$$Re_x = \rho_e V_e x / \mu_e$$

$$\mu_e = 1.716 \times 10^{-5} \left(\frac{T_e}{273.1}\right)^{3/2} \frac{383.1}{T_e + 110} \frac{Ns}{m^2}$$

$T_e$ in $K$

TURBULENT FLOW $$\delta_i = 0.37x / (Re_x)^{1/5}$$

$$\delta_c = \left(\frac{\delta_c}{\delta_i}\right)\delta_i$$

$$\delta_c^* = 0.125\delta_i\left(\frac{\delta_c}{\delta_i}\right)$$

$$\theta_c = 0.0972\delta_i\left(\frac{\theta_c}{\theta_i}\right)$$

where $$\frac{\delta_c}{\delta_i} = \left(\frac{\mu^* T^*}{\mu_e T_e}\right)^{1/5}$$

$$\frac{\theta_c}{\theta_i} = \left(\frac{\mu^*}{\mu_e}\right)^{1/5} / \left(\frac{T^*}{T_e}\right)^{4/5}$$

$$\frac{T^*}{T_e} = 0.5 + 0.039 M_e^2 + 0.5\left(\frac{T_w}{T_e}\right)$$

SYMBOLS $\delta$=boundary layer thickness
$\delta^*$=boundary layer displacement thickness
$\theta$=boundary layer momentum thickness
$\rho$=flow density
$V$=flow velocity
$x$=distance from leading edge
$\mu$=gas viscosity
$Re$=Reynolds number
superscript*=reference quantity

SUBSCRIPTS e=edge value
i=incompressible
c=compressible

To move flow restrictor 200 between stowed, partially deployed, and fully deployed positions, flow restrictor 200 has a pair of arms 230 that extend from periphery 220 of flow restrictor 200 and between periphery 220 and wall 112 of cowling 110. Although the example shown includes two arms 230, any number of arms can be used according to specific design requirements. Arms 230 have an axis of rotation B defined by a hinge pin, multiple individual hinge pins, or any other well know manner, that will connect flow restrictor 200 to cowling 110 and allow flow restrictor 200 to rotate about axis of rotation B when moving between stowed or retracted, partially deployed, and fully deployed positions. Arms 230 can be contained in individual recessed pockets in wall 112 of cowling 110, which can simplify sealing requirements.

In operation, flow restrictor 200 can be moved into the fully deployed position, as shown in FIGS. 1-2, 7, and 9-11, when hypersonic vehicle 10 is traveling at supersonic or subsonic speeds, such as when hypersonic vehicle 10 is accelerating to hypersonic speeds or decelerating from hypersonic speeds. As discussed above, with flow restrictor 200 in the fully deployed position, a first portion of the sub-hypersonic air flow will be deflected outside of inlet 100 and a second portion will be allowed to pass into inlet 100, as shown by the flow lines in FIG. 9, which will prevent the shock wave formed in front of inlet 100 and prevent inlet buzz and unstart conditions. As hypersonic vehicle 10 reaches or approaches air-breathing engine operating speed, flow restrictor 200 is retracted into the stowed or retracted position where flow restrictor 200 is disposed within recess 130 in cowling 110. In this position, all of the oncoming hypersonic air flow is allowed to pass into inlet 100 and hypersonic air-breathing engine 40 can be ignited.

While various embodiments have been described above, this disclosure is not intended to be limited thereto. Variations can be made to the disclosed embodiments that are still within the scope of the appended claims.

What is claimed is:

1. A hypersonic vehicle, comprising:
   a body;
   at least one control surface associated with the body; and
   a hypersonic air-breathing engine associated with the body, the engine comprising:
      a converging inlet having a fixed cowling having a first cross-sectional area, a throat in fluid communication with the cowling and having a second cross-sectional area, smaller than the first cross-sectional area, and a conformal restrictor recess formed in the cowling; and
      a flow restrictor having a third cross-sectional area that is smaller than the first cross-sectional area and movable between a stowed position and a fully deployed position; wherein
      a consistent gap is formed around an entire circumference of a periphery of the flow restrictor between the periphery of the flow restrictor and an inner surface of the cowling with the flow restrictor in the fully deployed position;
      a difference between the first cross-sectional area of the cowling and the third cross-sectional area of the flow restrictor is approximately equal to the second cross-sectional area of the throat; and the flow restrictor is stowed within the conformal restrictor recess in the stowed position.

2. The hypersonic vehicle of claim 1, wherein the flow restrictor does not impede air flow into the inlet in the stowed position and the flow restrictor deflects a portion of the air flow outside the inlet in the fully deployed position.

3. The hypersonic vehicle of claim 1, wherein the fixed cowling is curvilinear.

4. The hypersonic vehicle of claim 1, wherein the flow restrictor further comprises at least one arm extending between the periphery of the flow restrictor and a wall of the inlet.

5. The hypersonic vehicle of claim 4, wherein the at least one arm includes an axis of rotation and the flow restrictor rotates about the axis of rotation between the stowed and fully deployed positions.

6. The hypersonic vehicle of claim 1, wherein the at least one control surface is connected to the body.

7. The hypersonic vehicle of claim 1, wherein the at least one control surface is integral with the body.

8. The hypersonic vehicle of claim 1, wherein the engine is disposed within the body.

9. The hypersonic vehicle of claim 1, wherein the engine is connected to the body.

10. The hypersonic vehicle of claim 1, wherein the flow restrictor prevents inlet buzz and unstart conditions with the flow restrictor in the fully deployed position and air flow at speeds below an operating limit of the engine.

11. An air-breathing engine for a hypersonic vehicle, the engine comprising:
a converging inlet having a fixed cowling, a throat in fluid communication with the cowling, and a conformal restrictor recess formed in the cowling; and
a flow restrictor movable between a stowed position and a fully deployed position; wherein
a consistent gap is formed around an entire circumference of a periphery of the flow restrictor between the periphery of the flow restrictor and an inner surface of the cowling such that a difference between a first cross-sectional area of the cowling and a third cross-sectional area of the flow restrictor is approximately equal to a second cross-sectional area of the throat and the inlet has an internal contraction ratio of approximately 1:1 with the flow restrictor in the fully deployed position; and
the flow restrictor is stowed within the conformal restrictor recess in the stowed position.

12. The engine of claim 11, wherein the flow restrictor does not impede air flow into the inlet in the stowed position and the flow restrictor deflects a first portion of the air flow outside the inlet and allows a second portion of the air flow into the inlet in the fully deployed position.

13. The engine of claim 11, wherein the fixed cowling is curvilinear.

14. The engine of claim 11, wherein:
the cowling has a first cross-sectional area;
the throat has a second cross-sectional area, smaller than the first cross-sectional area of the cowling;
the flow restrictor has a third cross-sectional area, smaller than the first cross-sectional area of the cowling; and
a difference between the first cross-sectional area of the cowling and the third cross-sectional area of the flow restrictor is approximately equal to the second cross-sectional area of the throat.

15. The engine of claim 11, wherein the flow restrictor further comprises at least one arm extending between the periphery of the flow restrictor and a wall of the inlet.

16. The engine of claim 15, wherein the at least one arm includes an axis of rotation and the flow restrictor rotates about the axis of rotation between the stowed and fully deployed positions.

17. The engine of claim 11, wherein the flow restrictor prevents inlet buzz and unstart conditions with the flow restrictor in the fully deployed position and an air flow into the engine at speeds below an operating limit of the engine.

18. A method of preventing inlet buzz and unstart conditions in a hypersonic air-breathing engine, comprising the steps of:
providing a converging inlet having a fixed cowling having a first cross-sectional area, a throat in fluid communication with the cowling and having a second cross-sectional area, smaller than the first cross-sectional area, and a conformal restrictor recess formed in the fixed cowling; and
moving a flow restrictor having a third cross-sectional area that is smaller than the first cross-sectional area from a stowed position, in which the flow restrictor is stowed within the conformal restrictor recess, to a fully deployed position, in which the flow restrictor deflects a portion of an air flow outside of the inlet; wherein
a consistent gap is formed around an entire circumference of a periphery of the flow restrictor between the periphery of the flow restrictor and an inner surface of the cowling; and
a difference between the first cross-sectional area of the cowling and the third cross-sectional area of the flow restrictor is approximately equal to the second cross-sectional area of the throat.

19. The method of claim 18, wherein the fixed cowling is curvilinear.

20. The method of claim 18, further comprising the steps of:
providing at least one arm extending between the periphery of the flow restrictor and a wall of the inlet, the at least one arm including an axis of rotation; and
rotating the flow restrictor about the axis of rotation between the stowed and fully deployed positions.

21. The method of claim 18, wherein the flow restrictor prevents inlet buzz and unstart conditions with the flow restrictor in the fully deployed position and the air flow at speeds below an operating limit of the engine.

* * * * *